United States Patent [19]

Auracher et al.

[11] Patent Number: 4,871,223
[45] Date of Patent: Oct. 3, 1989

[54] ARRANGEMENT COMPRISING AT LEAST ONE INTEGRATED OPTICAL WAVEGUIDE ON A SUBSTRATE OF ELECTRO-OPTICAL MATERIAL AND COMPRISING AT LEAST ONE ELECTRODE

[75] Inventors: Franz Auracher, Baierbrunn; Bernd Noll, Munich, both of Fed. Rep. of Germany

[73] Assignee: Siemens Aktiengesellschaft, Munich, Fed. Rep. of Germany

[21] Appl. No.: 210,412

[22] Filed: Jun. 23, 1988

[30] Foreign Application Priority Data

Aug. 25, 1987 [DE] Fed. Rep. of Germany ....... 3728347

[51] Int. Cl.$^4$ .................................................. G02B 5/14
[52] U.S. Cl. ................................. 350/96.14; 350/96.13
[58] Field of Search ................ 350/96.12, 96.13, 96.14

[56] References Cited

U.S. PATENT DOCUMENTS

| 4,157,860 | 6/1979 | Marcatili | 350/96.14 |
| 4,545,078 | 10/1985 | Wiedeburg | 350/96.13 X |
| 4,679,893 | 7/1987 | Ramer | 350/96.13 |
| 4,683,448 | 7/1987 | Duchet et al. | 350/96.14 X |

OTHER PUBLICATIONS

Auracher et al., "High-Speed β-Reversal Directional Coupler Modulator With Low Insertion Loss For 1.3 μm In LiNbO$_3$", *Journal of Optical Communications*, 5 (1984) 1, pp. 7-9.

Alferness et al., "High-Speed Traveling-Wave Directional Coupler Switch/Modulator" for λ=1.32 μm, *IEEE Journal of Quantum Electronics*, vol. QE-19, No. 9, Sep. 1983, pp. 1339-1341.

*Primary Examiner*—William L. Sikes
*Assistant Examiner*—Akm E. Ullah
*Attorney, Agent, or Firm*—Hill, Van Santen, Steadman & Simpson

[57] ABSTRACT

An arrangement has at least one, and preferably two, optical waveguides integrated on a substrate of electro-optical material, has at least one first electrode for each of the waveguides being applied on the substrate and separated from the waveguide and substrate by an insulating layer and has at least one second electrode for each of the waveguides. The second electrodes are connected to a constant voltage source, while the first electrodes are connected to a modulating voltage source. The constant voltage source applied to the secondary electrodes and the position of these electrodes relative to the waveguides determines an operating point for modulating light in the waveguides.

12 Claims, 1 Drawing Sheet

U.S. Patent    Oct. 3, 1989    4,871,223
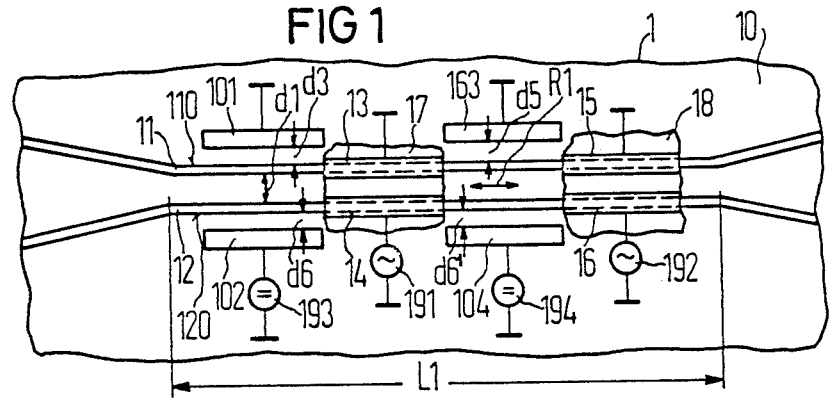
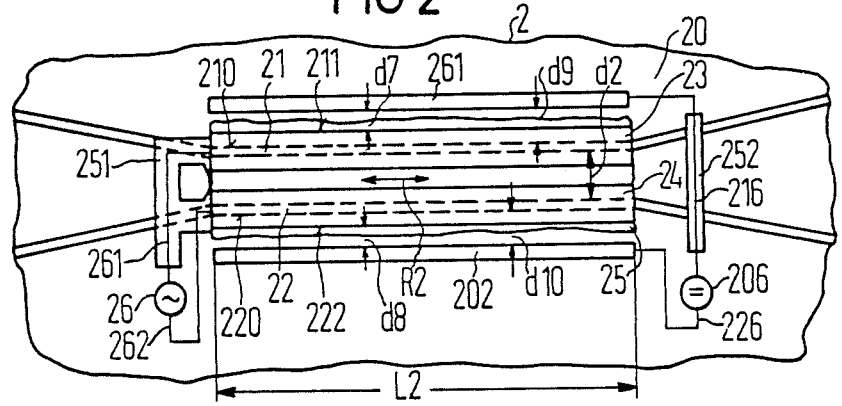
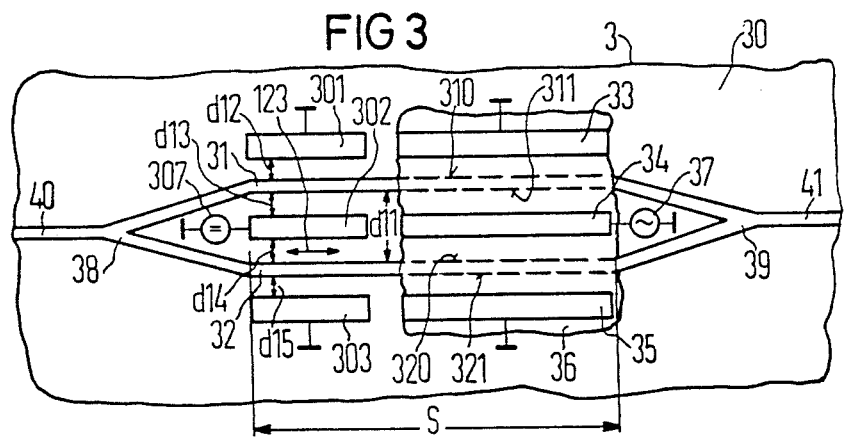

ARRANGEMENT COMPRISING AT LEAST ONE INTEGRATED OPTICAL WAVEGUIDE ON A SUBSTRATE OF ELECTRO-OPTICAL MATERIAL AND COMPRISING AT LEAST ONE ELECTRODE

BACKGROUND OF THE INVENTION

The present invention is directed to an arrangement comprising at least one integrated optical waveguide on a surface of a substrate which is composed of an electro-optical material and the arrangement has at least one electrode allocated to each waveguide, which is arranged on the surface of the substrate separated from the waveguide by an electrically insulating intermediate layer and serves the purpose of modulating or switching light conducted in the allocated waveguide with the assistance of electrical modulation or switching voltage that is applied to the electrode.

Electro-optical modulators and switches formed in a waveguide technique have been developed and employed in optical communication technology. Examples are disclosed in an article by Alferness et al "High-Speed Travelling-wave Directional Coupler Switch/Modulator for $\lambda = 1.32$ $\mu m$", *IEEE JOURNAL QUANTUM ELECTRONICS*, Vol. QE-19, No. 9, September 1983, pp. 1339-1341. The preferred electro-optical material of the substrate is currently $LiNbO_3$ because low attenuation optical waveguides can be manufactured in the substrate with a very simple technology. An example of a switch, which uses what is referred to as directional coupler principle in $LiNbO_3$, is disclosed in an article by Auracher et al entitled "High-Speed $\Delta\beta$-Reversal Directional Coupler Modulator with Low Insertion Loss for 1.3 $\mu m$ in $LiNbO_3$", *JOURNAL OF OPTICAL COMMUNICATIONS* 5 (1984), 1, pp. 7-9. In this switch, two optical waveguides are integrated at the surface of a substrate of $LiNbO_3$. These optical waveguides extend at a slight distance next to one another in a predetermined coupling path. An electrode pair composed of two separate electrodes for applying a switching voltage is arranged in the coupling path above the waveguide over the surface of the substrate and are separated from the waveguides and the surface of the substrate by a dielectric intermediate layer. The slight distance between the two waveguides in the coupling path is dimensioned so that the crossover of light between the waveguides occurs dependent on the switching voltage.

An electrode for applying an electrical modulation voltage or switching voltage must lie in the immediate proximity of the allocated waveguide so that the radio frequency control power can be kept low. It must, therefore, be arranged on the electrically insulating intermediate layer that prevents the optical field from being attenuated by this electrode. A constant voltage for setting the operating point of the arrangement must generally be applied to one or more electrodes for applying modulation voltage or switching voltage. It, therefore, turns out that the operating point drifts away with time. The cause of this is the low conductivity of the electrically insulating intermediate layer that, however, must have a precisely defined relationship to the conductivity of the substrate of the electro-optical material. The reproducible manufacture of such an insulating intermediate layer having a specific conductivity presents extremely great technological difficulties.

If the conductivity of the intermediate layer were made significantly higher than that of the substrate, the operating point could be stabilized. However, with this increase in the conductivity, the attenuation of light in the waveguide would also be increased.

SUMMARY OF THE INVENTION

The object of the present invention is for the stabilizing of the operating point for the electro-optical modulator or switch without the point of operation drifting away with time. This object is achieved by an improvement in an arrangement having at least one integrated optical waveguide on the surface of a substrate of electro-optical material and having means for modulating or switching light conducted in the waveguide including at least one modulation electrode allocated to the waveguide and being arranged on the surface of the substrate and separated therefrom by an electrically insulating intermediate layer, and means for applying electrical modulation or switching voltage to the electrode. The improvement is the provision of a secondary electrode for each of the waveguides for applying a predetermined constant or dc-voltage directly to the surface of the substrate at a distance from the allocated waveguide.

In the arrangement of the invention, the separate additional or secondary electrode allocated to the waveguide serves the purpose of applying the constant voltage that is required for setting the operating point. This secondary electrode is applied directly to the surface of the substrate at a distance from the allocated waveguide without any electrically insulating intermediate layer. The distance of this electrode from the allocated waveguide and, under certain conditions from the other waveguides as well, is to be of such a size that it does not attenuate this waveguide, even without an electrically insulating intermediate layer. The leads to this additional electrode that cross the waveguides must be conducted over the waveguides on an electrically insulating intermediate layer bridge. As in the known arrangement, the modulation electrode for applying a radio frequency electrical modulation voltage or switching voltage must lie in the immediate proximity of the allocated waveguide so that the radio frequency control power can be kept low. As previously, such electrodes must, therefore, be arranged on an electrically insulating layer that, however, can have a high resistivity due to the lack of dc-voltage.

Preferably, the arrangement is a switch or modulator having two optical waveguides integrated in the surface of the substrate to proceed at a slight distance next to one another for a predetermined coupling path, at least a pair of the modulation electrodes for applying the modulating or switching voltage and at least a pair of the secondary or additional electrodes for applying the dc-voltage. In another preferred embodiment, there are two optical waveguides, which proceed parallel to each other at a distance therebetween for a given path. There is at least a pair of the modulation electrodes for each of the waveguides for applying the modulating voltage and at least a pair of the secondary or additional electrodes for each waveguide for applying the constant voltage. If desired, one electrode of each of the pairs is disposed between the waveguides and is common to the two pairs of modulation electrodes and the two pairs of the secondary electrodes.

Other advantages and features of the present invention will be readily apparent from the following description of the preferred embodiments, the drawings and claims.

BRIEF DESCRIPTION OF THE DRAWINGS

FIG. 1 is a plan view of the arrangement of the present invention as a directional coupler having successive pairs of electrodes arranged along the length of the coupling path;

FIG. 2 is a modification of the directional coupler of FIG. 1 having a pair of modulation electrodes extending the length of the path with the second pair of electrodes spaced outwardly of the modulation or first electrodes; and FIG. 3 is a plan view of an arrangement of the present invention as a Mach-Zehnder modulator.

DESCRIPTION OF THE PREFERRED EMBODIMENTS

The principles of the present invention are particularly useful when incorporated in an arrangement or device illustrated in FIG. 1. The device of FIG. 1 has a substrate 1 composed of LiNbO$_3$ with a surface 10 on which two waveguides 11 and 12, which are illustrated as stripe waveguides, are integrated into the substrate. As illustrated, these optical waveguides 11 and 12 proceed side-by-side at a slight distance d1 for a coupling path L1.

A modification is illustrated in FIG. 2 and has two waveguides 21 and 22, which are integrated in a surface 20 of the substrate 2, which is of LiNbO$_3$. The waveguides 21 and 22 proceed side-by-side at a slight distance d2 for a coupling length L2.

In the embodiment of FIG. 1, two electrode pairs are arranged successively and at a distance from one another in the coupling length L1 in the longitudinal direction R1 of the two waveguides 11 and 12 with one of the electrode pairs being composed of two separate modulation electrodes 13 and 14 and the other pair being composed of two separate modulation electrodes 15 and 16. The electrodes 13 and 15 are allocated to the waveguide 11, while the electrodes 14 and 16 are allocated to the waveguide 12. Each of the electrodes 13–16 is arranged over its allocated waveguide 11 or 12, respectively, and is separated from the surface 10 of the substrate by a dielectric intermediate layer 17 and 18, respectively, which intermediate layer is composed of SiO$_2$.

A chronologically variable or periodic modulation or switching voltage is applied to the two modulation electrodes 13 and 14, for example by one of the two electrodes, such as the electrode 13, being connected to a defined potential, for example, ground, and the other electrode 14 being connected to a modulating or switching voltage source 191 for generating a chronologically variable modulation or switching voltage in comparison to the defined potential. A switching voltage applied in a corresponding fashion to the modulation electrodes 15 and 16, for example with the electrode 15 being connected to ground and the electrode 16 being connected to a modulating or switching voltage source 192 for generating a chronologically variable modulation or switching voltage relative to ground. The chronologically variable modulation or switching voltage can also be applied between the electrodes 13 and 14 or 15 and 16 so that a modulation or switching voltage source that generates this voltage is connected between the two electrodes.

In addition, two additional pairs of secondary electrodes, which are separated from the pair of modulation electrodes 13, 14 and 15 and 16, are arranged in the coupling path L1 of the arrangement according to FIG. 1. One of these secondary electrode pairs is composed of two secondary electrodes 101 and 102, which apply a predetermined constant voltage, and the other is composed of two additional or secondary electrodes 163 and 104, which apply a predetermined constant voltage. Each of these pairs of additional or secondary electrodes 101, 102, 163 and 104 is arranged preceeding or following one of the pairs of primary or modulation electrodes 13, 14 or 15, 16 in the longitudinal direction R1 of the waveguides 11 and 12. The secondary electrodes, such as 101 and 102 or 163 and 104, of each and every additional pair are applied directly on the surface 10 of the substrate opposite outer longitudinal sides or edges 110 and 120 of the waveguides 11 and 12 without an electrically insulating intermediate layer being applied. They are applied with the electrode 101 being at a distance d3 from the edge 110 and the electrode 163 being at a distance d5 from the edge 110 and the electrodes 102 being at a distance d6, and the electrode 104 is at a distance d6′ from the side or edge 120.

The application of a direct voltage to these additional or secondary electrodes 101 and 102 or, respectively, 163 and 104 of each and every additional electrode pair can, for example, occur so that the secondary electrodes of each and every pair has one electrode, such as the electrode 101 or 163 connected to ground while the other electrode 102 or 104 of each pair is connected to a constant voltage source, such as 193 or 194. These sources 193 and 194 supply a constant voltage which is required for setting the operating point for the device. The constant voltage can also be applied so that a constant voltage source that generates this difference is connected between the electrodes of the pairs, such as the electrodes 101 and 102, respectively. The distance d3, d5, d6 and d6′ are all identical and are dimensioned with such a size that the appertaining additional electrodes 101, 102, 104 and 163 do not attenuate the light in the waveguides 11 and 12.

In the embodiment of FIG. 2, only one pair of modulation electrodes composed of the separate modulation electrodes 23 and 24 is provided in the coupling path L2. The electrode 23 is allocated to the waveguide 21 and the electrode 24 is allocated to the waveguide 22. Every electrode 23 and 24 is arranged over its respective waveguide 21 or 22 and is separated from the surface 20 of the substrate 2 by, for example, a dielectric intermediate layer 25 composed of SiO$_2$.

A chronologically or periodically variable modulation or switching voltage is applied to the two electrodes 23 and 24, for example, by interposing a modulation or, respectively, switching voltage source 26 between the two electrodes 23 and 24. This source 26 generates a chronologically variable modulation or switching voltage. Insofar as the leads 261 and 262 from the source 26 to the electrodes 23 and 24 cross a waveguide 21 or 22, they must cross on an electrically insulating intermediate layer bridge 251, which is composed, for example of SiO$_2$. The chronologically variable modulation or switching voltage herein can also be generated so that one of the two electrodes 23 and 24 is connected to a defined potential, for example ground, and the other is applied or connected to the modulating or switching voltage source that generates the chronologically variable modulation or switching voltage relative to this potential.

The electrodes 23 and 24 extend over the entire coupling path L2 in the longitudinal direction R2 of the waveguides 21 and 23. Two separate, additional or secondary electrodes 202 and 261 of a secondary pair are arranged opposite the outer surfaces or edges 211 and 222 of the pair of the first-mentioned or modulation electrodes 23 and 24 and these are arranged at a distance, such as d7 or d8, from the pair. These secondary electrodes 261 and 202 are also arranged opposite the outer longitudinal sides 210 and 220 of the waveguides 21 and 22, respectively, at a distance d9 and d10. The distances d9 and d10, like the distances d7 and d8, can be identical to one another. A constant voltage is applied to the two outer additional or secondary electrodes 261 and 202, for example, by interposing a constant voltage source 206 that generates a constant voltage. Insofar as they cross the waveguides 21 and 22, leads, such as 216 or, respectively, 226, leading from the source 206 to the outer secondary electrodes 261 and 202, respectively, are conducted over the waveguides 21 and 22 on a dielectric intermediate layer bridge 252 which, again, is composed of $SiO_2$. The constant voltage can also be applied so that one of the two additional electrodes, such as 261 or 202 is connected to a defined potential, for example ground, and the other is connected directly to the source that generates the constant voltage relative to the defined potential or ground.

Like the electrodes 23 and 24, the additional electrodes or secondary electrodes 261 and 202, can extend over the entire coupling path L2 in the longitudinal direction R2 of the waveguides 21 and 22.

In the arrangement of FIGS. 1 and 2, the slight distance d1 or, respectively, d2 between the two waveguides 11 and 12 or 23 and 24 in the coupling path L1 or L2 and the constant voltage difference to be applied to the secondary electrodes 101–104 or 261 and 202 for defining the operating point of the particular arrangement are to be selected so that the cross over of the waveguide guided light between the two waveguides 11 and 12 or 21 and 22 occurs dependent on the modulation or switching voltage difference applied to the modulation electrodes, such as 13–16 or 23 and 24. Given employment of such an arrangement as a switch, it is to be dimensioned so that both switch statuses or states are achieved with symmetrical drive of the modulation voltage.

In the arrangement of the embodiment of FIG. 3, two optical waveguides 31 and 32, for example buried or embedded strip waveguides proceed at a distance d11 next to one another over a defined path S of a surface 30 of a substrate 3, which substrate is composed of $LiNbO_3$. In the defined path S, the waveguide 31, along both longitudinal sides 310 and 311, has a pair of modulation or primary electrodes 33 and 34, while the waveguide 32 along edges 320 and 321 has a pair of primary or modulation electrodes, such as 34 and 35. As illustrated, the electrode 34 is common to the pair associated with each of the two waveguides and is positioned between the two waveguides.

In any case, the two pairs of first electrodes are arranged to be separated from the surface 30 of the substrate 3 by a dielectric layer 36 and each of these electrode pairs serves the purpose of applying a chronologically variable modulation or switching voltage difference. The chronologically variable modulation or switching voltages can be applied to the different electrode pairs to be different from one another so that different electrical fields can be generated in the electro-optical material of the substrate and of the waveguides because different fields are generated between the electrodes of the pairs allocated at one waveguides and the electrodes of the pair allocated to the other waveguides. Thus, for example, a voltage polarized in a defined way can be applied between the electrodes 33 and 34 of the pair 33, 34 allocated to the waveguide 31 and this voltage generates an electrical field in the substrate 3 and the allocated waveguide 31 and an oppositely polarized voltage can be applied between the electrodes 34 and 35 of the other pair, which is oppositely polarized voltage generates an electrical field in the substrate and in the waveguide 32 that is directed opposite the first-mentioned field.

In the specific arrangement according to FIG. 3, this is achieved, for example, in that the two electrodes 33 and 35 of the two pairs arranged on the outside of the two waveguides 31 and 32, respectively, and are connected to a defined potential, for example a ground, while the electrode 34, which is common to each of the pairs and is positioned between the waveguides 31 and 32, is connected to a modulation or a switching voltage source 37 that generates a chronologically variable modulation or switching voltage relative to the defined potential. In this arrangement, too, a modulation or switching voltage to be applied to the modulation electrode pair 33 and 34 or, respectively, 34 and 35 can be generated by interposing a modulation or switching voltage source between the two modulation electrodes of the pair, and this source generates this difference.

The arrangement of FIG. 3 also includes two pairs of additional or secondary electrodes, such as 301, 302 and 303. These secondary electrodes 301–303 are arranged in the defined path S along both the longitudinal sides 310 and 311 or, respectively, 320 and 321 of each of the waveguides 31 and 32, respectively. These electrodes 301–303 are arranged directly on the surface 30 of the substrate without any electrically insulating intermediate layer.

For example, the pairs of additional electrodes composed of electrodes 301 and 302 are allocated to the waveguide 31, while the pair 302 and 303 are allocated to the waveguide 32. The electrode 302 is arranged between the waveguides 31 and 32 and is common to each of the pairs and, thus, forms a single electrode 302 that is allocated to both of the two waveguides 31 and 32, as shown in FIG. 3.

As illustrated, the electrode 301 is at a distance d12 from the waveguide 31, while the electrode 302 is at a distance d13. The electrode 302 is also at a distance d14 from the waveguide 32, while the outer electrode 303 is at a distance d15 from the waveguide 32. These distances d12–d15 are selected to be such a size that none of the additional electrodes 301–303 will attenuate the light in the two waveguides 31 and 32. The distance d11 between the two waveguides 31 and 32 in the path S is selected to be of such a size that they do not mutually influence one another in this path S.

Each of these additional or secondary electrode pairs 301 and 302 or, respectively, 302 and 303 serve the purpose of applying respective constant voltage with which the operating point of the arrangement can be fixed. For example, the constant voltage to be applied to the pair of additional electrodes 301 and 302 or, respectively, the pair 302, 303 can be generated so that one electrode of the pair, for example, the electrode 301 or 303, which are arranged outside of the two waveguides 31 and 32, is connected to a defined potential, for example, ground. The other electrode 302, which, as illustrated, is common to both pairs and is arranged between the two waveguides 31 and 32, is connected to a constant voltage source 307 that generates a constant voltage in comparison to the defined potential or ground potential. The constant voltage to be applied to the electrode pairs 301 and 302 or 302 and 303 can also be generated so that the constant voltage source that generates this constant voltage is connected between the electrodes 301 and 302 or 302 and 303, respectively.

The pairs of additional or secondary electrodes are preferably arranged either proceeding or following the pairs of primary electrodes in the longitudinal direction R3 of the two waveguides 31 and 32. Particularly, they are arranged so that all additional or secondary electrodes 301–303 and the pairs are arranged in common, either proceeding or following the primary electrodes 33, 34 and 35 or one of the electrode pairs 33, 34 and 34, 35.

For completing the Mach-Zehnder modulator according to FIG. 3, the two waveguides 31 and 32 are connected at each end of the path S by a respective waveguide fork 38 or 39, with the fork 38 being connected to a waveguide 40 and the fork 39 being connected to the waveguide 41. The waveguide forks 38 and 39, with their respective waveguides 40 and 41, are expediently integrated on the surface 30 of the substrate 3 and are of the same type as the two waveguides 31 and 32.

While the description of the electrodes, such as the electrodes 33, 34 and 35, has the electrode 34 being common to both pairs, the electrode 34 could be formed by two separate electrodes. In a similar manner, the middle electrode or common electrode 302 of the secondary or additional electrodes 301–303 could be formed by two separate electrodes instead of being a single common electrode.

Although various minor modifications may be suggested by those versed in the art, it should be understood that we wish to embody within the scope of the patent granted hereon all such modifications as reasonably and properly come within the scope of our contribution to the art.

We claim:

1. In an arrangement having at least one integrated optical waveguide on the surface of a substrate of electro-optical material, means for modulating light conducted in each waveguide including a modulation electrode being allocated to each waveguide and being arranged on the surface of the substrate and separated therefrom by an electrically insulating layer and means for applying a modulating voltage to the electrode, the improvements comprising at least one separate secondary electrode being allocated to each waveguide and means for applying a predetermined constant voltage to the secondary electrode, said secondary electrode being applied directly to the surface of the substrate at a distance from the associated waveguide.

2. In an arrangement according to claim 1, which includes at least two optical waveguides being integrated on the surface of the substrate at a slight distance apart over a predetermined coupling path, at least one pair of modulation electrodes being positioned along at least a portion of the coupling path of the pair of waveguides and at least one pair of the secondary electrodes being applied directly onto the substrate next to the waveguides in the coupling path and being separated from the pair of modulation electrodes, said slight distances between the two waveguides in the coupling path and the constant voltage being selected so that a cross over of light between the light waveguides will occur, dependent on the modulation voltage applied to the modulation electrodes.

3. In an arrangement according to claim 2, wherein there are at least two pairs of the modulation electrodes and at least two pairs of the secondary electrodes, said electrodes being arranged successively along the direction of the two waveguides in the region of the coupling path.

4. In an arrangement according to claim 3, wherein the two pairs of the modulation electrodes and the two pairs of the secondary electrodes are arranged in alternating succession along the coupling path of the waveguides.

5. In an arrangement according to claim 4, wherein the modulation electrodes overlie a portion of the waveguide and wherein the secondary electrodes are arranged opposite outer longitudinal edges of the waveguides.

6. In an arrangement according to claim 2, wherein the pair of modulation electrodes extends the length of the coupling path and the pair of secondary electrodes is arranged outside of the pair of modulation electrodes.

7. In an arrangement according to claim 1, which includes two optical waveguides being integrated on the surface of the substrate, said two optical waveguides proceeding at a distance apart from each other for a defined path, a pair of the modulation electrodes for each of the two waveguides being positioned along the defined path on both sides of the waveguide, said modulation electrodes being separated from the surface of the substrate by the dielectric, intermediate layer, a pair of secondary electrodes associated with each of the waveguides along the path and being directly applied to the surface of the substrate.

8. In an arrangement according to claim 7, wherein an electrode of each of the pairs of modulation electrodes is disposed between the two waveguides and is a common electrode for each pair.

9. In an arrangement according to claim 8, wherein a secondary electrode is arranged between the two waveguides and is a common electrode for each pair of secondary electrodes.

10. In an arrangement according to claim 7, wherein pairs of the modulation electrodes and the pairs of the secondary electrodes are arranged in succession along the longitudinal direction of the waveguides.

11. In an arrangement according to claim 10, wherein one modulation electrode of each pair of the modulation electrodes is a common electrode for both pairs and is arranged between the waveguides.

12. In an arrangement according to claim 11, wherein one of the secondary electrodes is arranged between the two waveguides and is a common waveguide for each of the pairs of secondary electrodes.

* * * * *